July 31, 1962     J. S. TAYLOR     3,047,421
METHOD OF MAKING CEMENTABLE FLUOROCARBONS, SUCH
AS POLYTETRAFLUOROETHYLENE AND THE
LIKE AND THE PRODUCT
Filed June 8, 1960
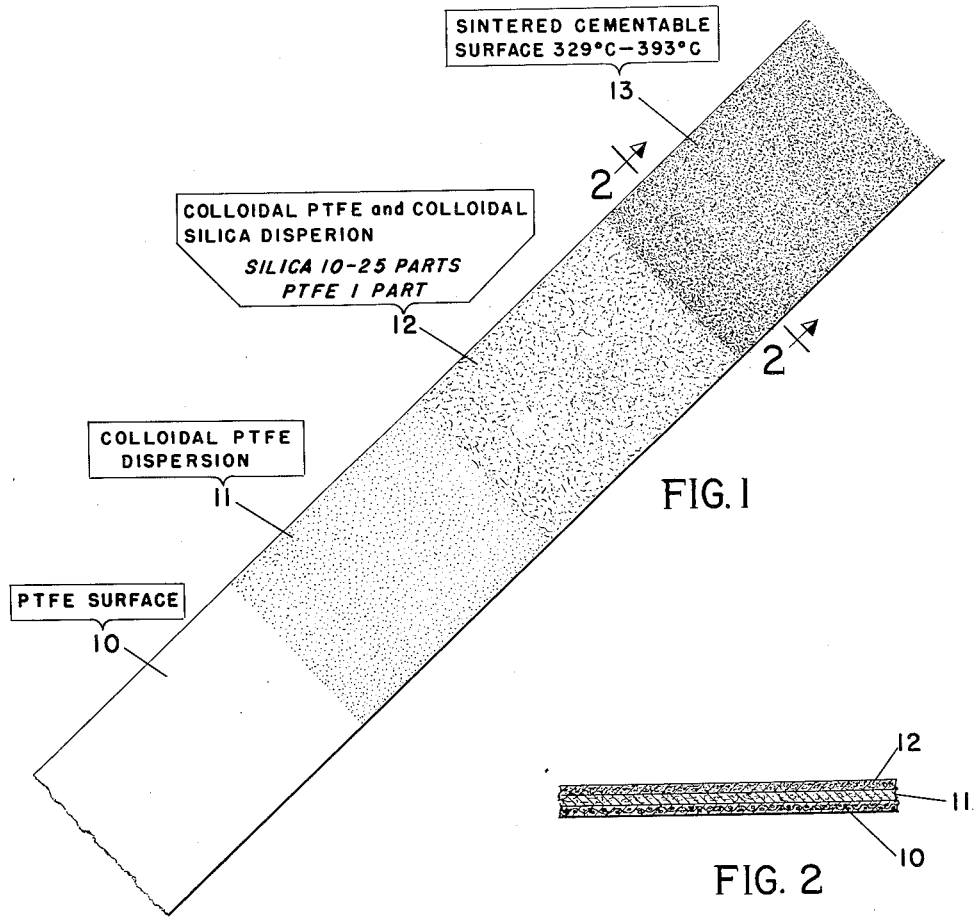
INVENTOR.
John S. Taylor
BY
Wm. R. Glisson
ATTORNEY 3,047,421
METHOD OF MAKING CEMENTABLE FLUORO-
CARBONS, SUCH AS POLYTETRAFLUORO-
ETHYLENE AND THE LIKE AND THE PRODUCT
John S. Taylor, Wilmington, Del., assignor to Continental-
Diamond Fibre Corp., Newark, Del., a corporation of
Delaware
Filed June 8, 1960, Ser. No. 34,804
5 Claims. (Cl. 117—70)

This invention relates to a method of making cementable fluorocarbons, such as polytetrafluoroethylene (PTFE), polytrifluorochloroethylene (PTFE or "Kel-F"), and the like, and the product, and has for an object the provision of improvements in this art.

One of the particular objects of the invention is to provide a method of making an improved cementable material of the kind described.

Another object is to provide a method which does not cause decomposition of the polymer on or below the surface of the base material.

Another object is to provide a method which uses a minimum amount of expensive material in forming the cementable surface.

Another object is to provide a method which is safe and free from objectionable fumes.

Another object is to provide a product which has the maximum desirable mechanical and electrical properties.

The above and other objects and advantages of the invention will be apparent from the following description of an exemplary embodiment of the invention, reference being made to the accompanying drawings wherein:

FIG. 1 is a plan perspective of a tape treated according to the present method.

FIG. 2 is a section taken on the line 2—2 of FIG. 1; and

FIG. 3 is a section of an unsintered PTFE tape made cementable by the present method.

One method of making cementable PTFE is to treat the surface with a mixture of ammonia and an alkali metal. This is a difficult process to operate and control, requires complex equipment, produces troublesome fumes, leaves a discolored surface and reduces the mechanical and electrical properties.

Another method is that in which a colloidal fluorocarbon resin and a colloidal silica are applied to a PTFE surface and heated to 500 to 550° C. for 0.1 to 5 minutes, the ratio of fluorocarbon to silica being very high, in the range of 5 to 20 of fluorocarbon to 1 of silica. Wherever parts are referred to herein, parts by weight is meant, as is usual in this art.

I have found that by using the materials of the above method in a different way and by altering the treatment I can produce a superior cementable surface with less of the expensive PTFE.

My method consists of mixing colloidal silica dispersion with "Teflon" 30 dispersion and coating a surface with this mixture and the drying and sintering the surface coating at 625 to 740° F. (329 to 393°). The ratio of silica dispersion to PTFE being 10 to 25 silica to 1 PTFE.

On GB-108 TL glass supported PTFE there was first applied a coating of 1.05 to 1.40 specific gravity T-30 "Teflon" dispersion; then a second dip was made with a dilute mixture of "Ludox" (Dupont colloidal silica) in "Teflon" 30 dispersion with a solids ratio of 15 "Ludox" and 1 "Teflon." This was dried and sintered. These samples (GB-108 TL made of No. 108 glass fabric 2 mils thick) bonded to an epoxyglass laminate produced a bond so strong that the "Teflon" resin was ripped off the glass fabric. A sample of glass-supported "Teflon" made of GB-116T fiberglass 0.004" thick bonded to an epoxy-glass laminate had a bond strength of 5 to 6 lbs. per inch.

In FIGS. 1 and 2, the numeral 10 designates a sintered PTFE tape or sheet or a glass-supported PTFE body with a surface to be made cementable. A coating of colloidal PTFE dispersion 11 is applied; then a coating 12 of a mixture of colloidal PTFE and colloidal silica is applied; and then the coatings sintered to provide the cementable surface 13.

In FIG. 3 an unsintered tape or sheet 15 of PTFE is coated, at 16, with a mixture of colloidal PTFE and colloidal silica and the entire build-up sintered at one time to provide a PTFE body with a cementable surface.

The product has a natural to white surface color whereas the ammonia-alkali treated material has a dark color. It has unimpaired mechanical and electrical properties and is not harmed by ultra-violet light, a source of trouble with the material treated by the ammonia-alkali process. It will not lose its cementable properties up to the degradation temperature of PTFE, which is above 500° F.; whereas a sodium-ammonia treated cementable surface of PTFE is slowly destroyed at 500° F.

Ordinary cold adhesives of a thermoplastic nature such as polyvinylbutral or of a thermosetting nature such as the phenolic and epoxy resins can be used with the present product. A pressure sensitive adhesive coating can also be applied.

Cementable PTFE made by the present method can be made into a laminate by treating one or both surfaces and coating with a resin adhesive, such as phenol-formaldehyde, epoxy, polyester, etc., by the usual methods of laminating known in the art. The surface will not be injured at the curing temperatures of these adhesives. The laminate so made has unusual toughness and strength and is resistant to chemicals and moisture. It is good for many uses including electrical insulation. It can also be used with a silicone rubber cement, one such being known as Silastic No. 140 made by Dow Corning Corp. This can be used to bond to various substrates, metals and non-metals. It can be bonded to various types of materials such as "Dilecto," a laminated phenolic product, wood, plastics, etc. and can be used for bearings, for barriers which are resistant to corrosion and moisture and for electrical insulation as coverings, separations, and the like. Both virgin and glass-supported PTFE can be used.

The method can be applied to any of the perfluorocarbon resins such at "Teflon" 100 which is a copolymer of hexafluoropropylene and tetrafluoroethylene.

The process is applicable to any surface of PTFE or the like, whether supported, as by glass fabric or the like, or unsupported. Skived or extruded tape can be treated in the same way to produce a cementable surface. The bond strength is about double that of the cementable surface made by the prior known silica-PTFE dispersion methods.

The method can be applied to either sintered or unsintered PTFE and the like base surfaces. If the base surface is unsintered it will not be necessary to apply the first coating of PTFE since the unsintered base surface will serve the same purpose.

The relative thicknesses of layers shown in the drawing are to be understood as being out of scale for purposes of illustration, it being obviously impracticable to show actual relative thicknesses accurately in patent drawings.

While one embodiment of the invention has been disclosed by way of illustration, it is to be understood that there may be various embodiments and modifications within the general scope of the invention.

What is claimed is:
1. The method of making a fluorocarbon surface cementable, which comprises, applying a coating of a colloidal dispersion of polytetrafluoroethylene on the sur- face, drying the coating, coating the dried surface with a coating comprising a dispersion mixture by weight of 10 to 25 parts of colloidal silica and 1 part of colloidal polytetrafluoroethylene, and sintering at from 329° to 393° C.

2. The method of making a polytetrafluoroethylene surface cementable, which comprises, applying a coating of a colloidal dispersion of polytetrafluoroethylene on the surface, drying the coating, coating the dried surface with a coating comprising a dispersion mixture by weight of 10 to 25 parts of colloidal silica and 1 part of colloidal polytetrafluoroethylene, and sintering at from 329° C. to 393° C.

3. The method of making a polytetrafluoroethylene surface cementable, which comprises, coating an unsintered polytetrafluoroethylene surface with a dispersion mixture by weight of 10 to 25 parts of colloidal silica and 1 part of polytetrafluoroethylene, and sintering at from 329° C. to 393° C.

4. A product comprising a polytetrafluoroethylene base with a first outer layer of polytetrafluoroethylene and a top layer comprising a mixture of colloidal silica, 10 to 25 parts by weight to 1 part colloidal polytetrafluoroethylene by weight integrally sintered together in unburned and undegraded condition, the coating being white and not subject to injury by ultra violet light and forming a strong bond with usual adhesives.

5. A product comprising a fluorocarbon base with a first outer layer of polytetrafluoroethylene and a top layer comprising a mixture of colloidal silica, 10 to 25 parts by weight to 1 part colloidal polytetrafluoroethylene by weight integrally sintered together in unburned and undegraded condition, the coating being white and not subject to injury by ultra violet light and forming a strong bond with usual adhesives.

References Cited in the file of this patent
UNITED STATES PATENTS

| | | |
|---|---|---|
| 2,592,147 | Ikeda | Apr. 8, 1952 |
| 2,875,664 | Huntsberger | Mar. 4, 1958 |
| 2,906,658 | Doban | Sept. 29, 1959 |
| 2,909,443 | Wolinski | Oct. 20, 1959 |